United States Patent
Jones et al.

(10) Patent No.: US 9,205,691 B1
(45) Date of Patent: Dec. 8, 2015

(54) SYSTEM FOR COMPENSATING FOR DROP VOLUME VARIATION BETWEEN INKJETS IN A THREE-DIMENSIONAL OBJECT PRINTER

(71) Applicant: Xerox Corporation, Norwalk, CT (US)

(72) Inventors: Timothy J. Jones, Canby, OR (US);
James D. Padgett, Lake Oswego, OR (US); Cory D. Luth, Wilsonville, OR (US); Lisa M. Schmidt, Portland, OR (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/560,041

(22) Filed: Dec. 4, 2014

(51) Int. Cl.
| B41J 29/38 | (2006.01) |
| B41J 29/393 | (2006.01) |
| B33Y 50/00 | (2015.01) |
| B33Y 10/00 | (2015.01) |
| B33Y 30/00 | (2015.01) |

(52) U.S. Cl.
CPC .............. *B41J 29/393* (2013.01); *B33Y 10/00* (2014.12); *B33Y 30/00* (2014.12); *B33Y 50/00* (2014.12)

(58) Field of Classification Search
CPC ..... B41J 2/16579; B41J 2/2135; B41J 29/393
USPC .................................... 347/5, 6, 9, 10, 14, 19
See application file for complete search history.

(56) References Cited

U.S. PATENT DOCUMENTS

| 4,907,013 | A | 3/1990 | Hubbard et al. |
| 5,099,256 | A | 3/1992 | Anderson |
| 7,338,144 | B2 | 3/2008 | Mantell et al. |
| 7,824,001 | B2 | 11/2010 | Fienup et al. |
| 8,017,055 | B2 | 9/2011 | Davidson et al. |
| 8,414,102 | B2 * | 4/2013 | Viturro et al. ................... 347/19 |
| 8,747,097 | B2 | 6/2014 | Pettis |
| 2008/0055666 | A1 * | 3/2008 | Gila et al. ..................... 358/448 |
| 2011/0122185 | A1 * | 5/2011 | Lutz ............................... 347/14 |

FOREIGN PATENT DOCUMENTS

JP    2007331257 A    * 12/2007    ................ B41J 2/01

* cited by examiner

*Primary Examiner* — Hai C Pham
(74) *Attorney, Agent, or Firm* — Maginot, Moore & Beck LLP

(57) ABSTRACT

A three-dimensional object printer compensates for variations in ejected material drop volumes by adjusting firing signal parameters. The printer includes an optical sensor that generates height measurement data of columns of material in a test pattern. Differences between the height of columns of material in the test pattern formed by the ejectors in the printhead and the expected height of the columns are compared to a predetermined range to detect drop variations that are out of tolerance. The modification of the firing signal parameter adjust the operation of the ejectors to bring the volume of the drops ejected by the ejector within tolerance range to reduce the ink drop velocities of the ejected drops within a predetermined range.

17 Claims, 3 Drawing Sheets

SYSTEM FOR COMPENSATING FOR DROP VOLUME VARIATION BETWEEN INKJETS IN A THREE-DIMENSIONAL OBJECT PRINTER

TECHNICAL FIELD

The device disclosed in this document relates to printers that produce three-dimensional objects and, more particularly, to the accurate production of objects with such printers.

BACKGROUND

Digital three-dimensional manufacturing, also known as digital additive manufacturing, is a process of making a three-dimensional solid object of virtually any shape from a digital model. Three-dimensional printing is an additive process in which one or more printheads eject successive layers of material on a substrate in different shapes. The substrate is supported either on a platform that can be moved three dimensionally by operation of actuators operatively connected to the platform, or the printhead or printheads are operatively connected to one or more actuators for controlled movement of the printhead or printheads to produce the layers that form the object. Three-dimensional printing is distinguishable from traditional object-forming techniques, which mostly rely on the removal of material from a work piece by a subtractive process, such as cutting or drilling.

The production of a three-dimensional object with these printers can require hours or, with some objects, even days. One issue that arises in the production of three-dimensional objects with a three-dimensional printer is consistent functionality of the inkjets in the printheads that eject the ink drops that form the objects. During printing of an object, one or more inkjets can eject material with a drop volume that is slightly different from the drop volume of the inkjets surrounding the inkjet. These volumetric differences can accumulate during the printing of the multiple layers that form an object so the column of material formed by the inkjet ejecting the smaller or larger drops can be shorter or taller, respectively, than the surrounding material columns formed by the other inkjets. These surface variations can be significant enough to require the scrapping of the object. Because the print jobs can require many hours or multiple days to produce objects, this scrapping of objects can be expensive and time consuming. A three-dimensional object printer capable of compensating for the volumetric variations in material drops ejected by inkjets in such printers would be advantageous.

SUMMARY

A three-dimensional object printer that detects volumetric drop variations in the inkjets during printing and adjusts the firing signal parameters used to operate the printheads in such printers to compensate for these variations has been developed. The three-dimensional object printer includes a platen, a printhead configured with ejectors to eject material onto the platen, an optical sensor configured to generate data corresponding to a height of material on the platen at a plurality of locations on the platen, and a controller operatively connected to the optical sensor and the printhead, the controller being configured to generate raster image data forming a test pattern on the platen, to operate the printhead to eject material onto the platen with reference to the raster image data for the test pattern, and to modify firing signal parameters for at least one ejector with reference to measured differences in height between columns in the test pattern and heights corresponding to raster data used to form the columns in the test pattern to compensate for variations in drop volumes between the at least one ejector and other ejectors in the printhead ejecting material.

A method has been developed for operating a three-dimensional object printer that detects volumetric drop variations in the inkjets during printing and adjusts the firing signal parameters used to operate the printheads in the printer to compensate for these variations. The method includes generating with a controller raster image data for forming a test pattern on a platen in the printer, operating a printhead to eject material onto the platen with reference to the generated raster image data for the test pattern, generating data with an optical sensor that corresponds to a height of material in the test pattern formed on the platen at a plurality of locations on the platen, and modifying firing signal parameters for at least one ejector in the printhead with reference to measured differences in height between columns in the test pattern and heights corresponding to raster data used to form the columns in the test pattern to compensate for variations in drop volumes between the at least one ejector and other ejectors in the printhead ejecting material.

A non-transitory computer readable storage media is described below that enables a computer to perform a method that operates a three-dimensional object printer to compensate for drop volume variations between inkjets in the printer. Programmed instructions for operating the printer are stored on the non-transitory computer readable storage media. The programmed instructions are configured to enable a controller or other processor executing the programmed instructions to: (1) generate a test pattern with ejectors in printheads of the printer, (2) measure the heights of the columns in the test patterns, (3) generate the differences between the test pattern columns and the expected height of the columns corresponding to the raster data used to form the test pattern columns, (4) compare each difference to the predetermined range, and (5) compensate for variations in drop volumes between the ejectors in the printhead ejecting material to form the test pattern by modifying the firing signal parameters for at least one ejector in the printhead with reference to the generated differences.

BRIEF DESCRIPTION OF THE DRAWINGS

The foregoing aspects and other features of an apparatus or printer that detects volumetric drop variations in the inkjets during printing and adjusts firing signal parameters to compensate for these variations are explained in the following description, taken in connection with the accompanying drawings.

DETAILED DESCRIPTION

Figure 1:
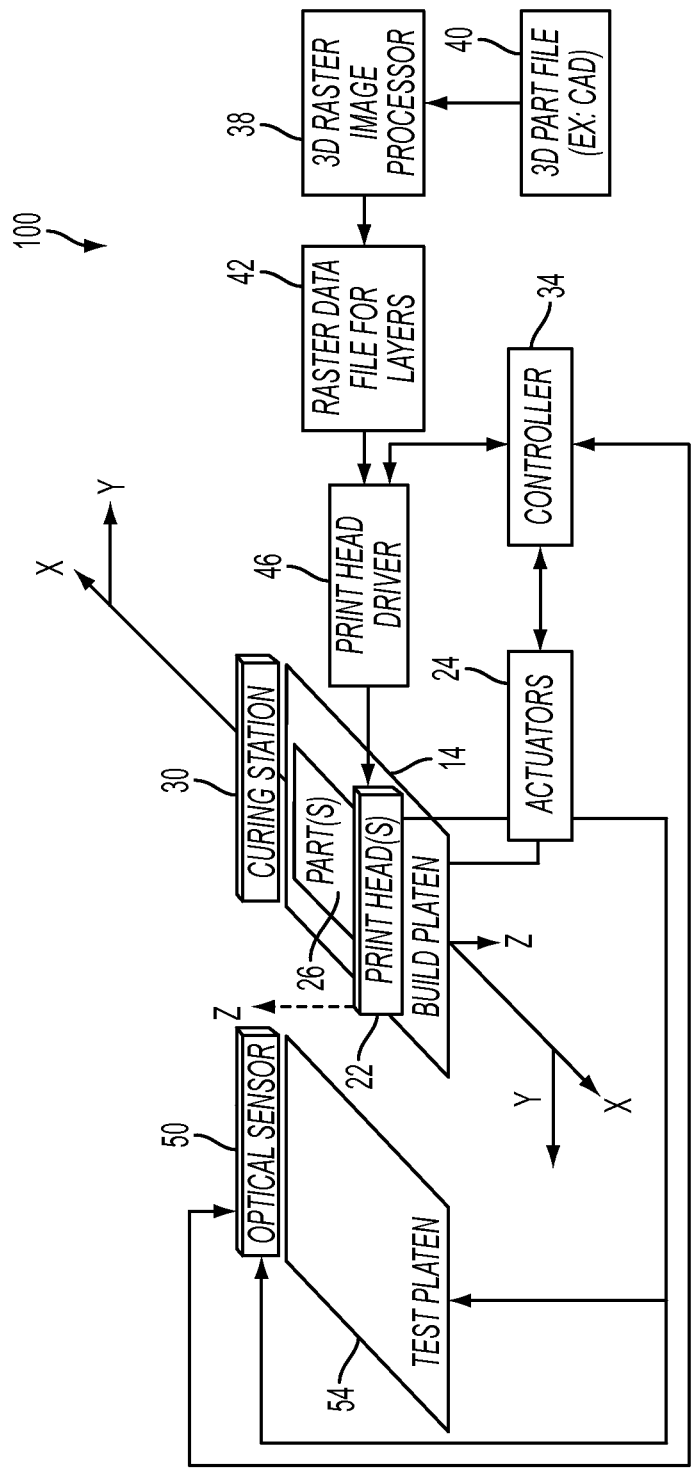
FIG. 1 is block diagram of a three-dimensional object printer that detects material drop volume variations between inkjets in the one or more printheads in the printer and compensates for the variations by adjusting firing signal parameters.

For a general understanding of the environment for the device disclosed herein as well as the details for the device, reference is made to the drawings. In the drawings, like reference numerals designate like elements.

As used herein, the terms "electrical firing signal," "firing signal," and "electrical signal" are used interchangeably to refer to an electrical energy waveform that triggers an actuator in an inkjet to eject an ink drop. Examples of actuators in inkjets include, but are not limited to, piezoelectric, and electrostatic actuators. A piezoelectric actuator includes a piezoelectric transducer that changes shape when the firing signal is applied to the transducer. The transducer proximate to a pressure chamber that holds liquid ink, and the change in shape of the transducer urges some of the ink in the pressure chamber through an outlet nozzle in the form of an ink drop that is ejected from the inkjet. In an electrostatic actuator, the ink includes electrically charged particles. The electrical firing signal generates an electrostatic charge on an actuator with the same polarity as the electrostatic charge in the ink to repel ink from the actuator and eject an ink drop from the inkjet.

As used herein, the term "peak voltage level" refers to a maximum amplitude level of an electrical firing signal. As described in more detail below, some firing signals include a waveform with both positive and negative peak voltage levels. The positive peak voltage level and negative peak voltage level in a firing signal waveform may have the same amplitude or different amplitudes. In some inkjet embodiments, the peak voltage level of the firing signal affects the mass and velocity of the ink drop that is ejected from the inkjet in response to the firing signal. For example, higher peak voltage levels for the firing signal increase the mass and velocity of the ink drop that is ejected from the inkjet, while lower peak voltage levels decrease the mass and velocity of the ejected ink drop. Since the image receiving surface moves in a process direction relative to the inkjet at a substantially constant rate and typically remains at a fixed distance from the inkjet, changes in the velocity of the ejected ink drops affect the relative locations of where the ink drops land on the image receiving surface in the process direction.

As used herein, the term "peak voltage duration" refers to a time duration of the peak voltage level during a firing signal. The peak voltage duration can refer to the duration of both a positive peak voltage level and negative peak voltage level in a signal. Different electrical firing signal waveforms include positive peak voltage durations and negative peak voltage durations that are either equally long or of different durations. In one embodiment, an increase in the duration of the peak voltage level in the firing signal increases the ejection velocity of the ink drop while a decrease in the duration of the peak voltage level decreases the ejection velocity of the ink drop. These velocity changes reduce the variation in the ink drop velocities ejected by the printhead. When the ink drop velocity variation is reduced, the accuracy of the ink drop placement is increased.

As used herein, the term "waveform component" refers to any parameter in the shape or magnitude of an electrical firing signal waveform that is adjusted to affect the velocity of an ink drop that is ejected from an inkjet in response to the generation of the waveform with the adjusted component parameter. The peak voltage level and peak voltage duration are examples of waveform components in electrical firing signals. As described below, an inkjet printer adjusts one or more waveform components including either or both of the peak voltage level and peak voltage duration to adjust the ejection velocities of ink drops on a drop-by-drop basis during an imaging operation. Since different ink drop ejection patterns result in variations of the ink drop velocity due to the characteristics of the inkjet and printhead, the adjustments to the waveform components enable more accurate placement of ink drop patterns on the image receiving surface during the imaging operation.

Figure 3:
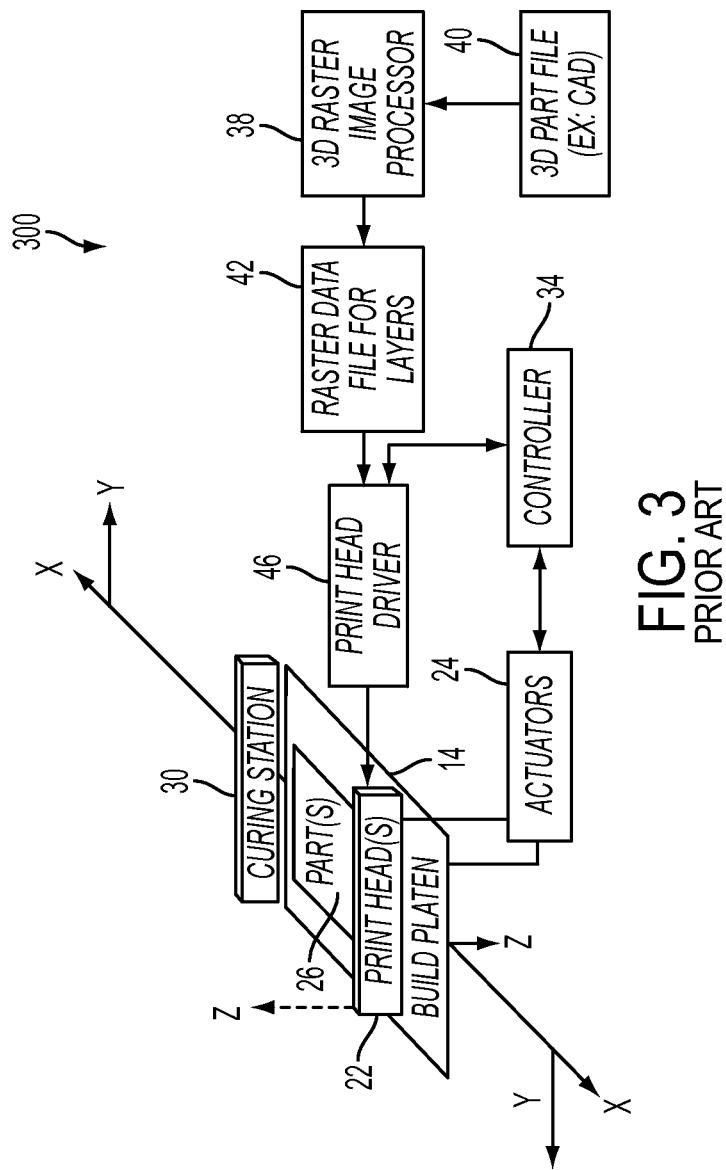
FIG. 3 is a block diagram of a prior art three-dimensional object printer.

FIG. 3 shows a configuration of components in a prior art printer 300, which produces a three-dimensional object or part 26. The printer 300 includes a support platen 14 on which one or more printheads 22 form an object or part 26. The printhead(s) are configured to eject building material and support material to form the part 26. These materials can require curing so the printer 300 includes a curing device 30. In some embodiments that eject photopolymer building material, the curing device 30 is an ultraviolet (UV) radiation source.

The printhead(s) 22 and support platen 14 are configured with actuators and the like for movement. As shown in the figure, the support platen 14 is configured for movement along an X axis and the printhead(s) is configured to move along a Z axis, although the platen 14 could also be configured for movement along the Z axis. The movements of the platen 14 and the printhead(s) 22 are coordinated by a controller 34, which is operatively connected to the actuators with which the platen and printhead(s) are configured for movement. In the figure, the printhead(s) 22 are wider along a Y axis than the part being built. Consequently, movement along the Y axis is not required. In some embodiments, the printhead(s) are not wider than the part so the platen 14 and/or printhead(s) 22 are configured for movement in the Y axis. As used herein, the term "process direction" refers to movement along one axis in the surface of the support platen 14 and "cross-process direction" refers to movement along an axis in the support platen 14 that is orthogonal to the process direction axis in that platen. Thus, the process and cross-process directions in FIG. 3 refer to the X axis and Y axis, respectively. While the platen 14 of FIG. 3 is shown as a planar member, other embodiments of three-dimensional printers include platens that are circular discs, an inner wall of a rotating cylinder or drum, or a rotating cone. The movement of the platen and the printhead(s) in these printers can be described with polar coordinates.

To operate the ejectors in the printhead(s), a three-dimensional raster processor 38 receives a file 40 of three-dimensional data of the part to be produced. These three-dimensional part data can be contained in a computer-aided design (CAD) file, for example. The processor 38 uses these data to generate a raster data file 42, which contains data that correspond to thin layers of the part. Typically, a layer has a thickness of a single drop of material. The printhead driver 46 receives the raster data file 42 and generates pixelated data that are used to operate the ejectors in the printhead(s) 22 for the ejection of building and support material onto the support platen 14 to form the part layer by layer. These pixelated data consist of voxels. A "voxel" as used in this document refers to data used to generate a firing signal for a single ejector in a printhead to eject one drop of material. The printhead driver 46 and the controller 34 generate signals to coordinate the movement of the platen 14 and the printhead(s) 22 with the operation of the ejectors in the printhead. As noted above, the movements of the platen and printhead(s) in a prior art printer, such as printer 300, are monitored with encoders and the like to enable the controller 34 to control the positioning of those components accurately.

As noted previously, one source of error in three-dimensional object printing arises from variations in the volumes of material drops from ejector to ejector. A printer has been developed that detects material drop variations and compensates for these variations by adjusting firing signal parameters. One embodiment of such a printer is shown in FIG. 1.

Using like reference numerals for like components, the printer 100 includes a platen 14, printhead(s) 22, curing device 30, a controller 34, a raster image processor 38 that generates a raster data file 42 for forming a test pattern, and a printhead driver 46. Additionally, the printer 100 also includes an optical sensor 50 and a test pattern platen 54. The controller 34 operates some of the actuators 24 to move the printhead(s) 22 to a position above the platen 54 and operate the printhead(s) 22 to form a test pattern on the platen with material drops ejected from the printhead(s) 22. Additionally, the controller 34 can operate some actuators 24 to move the platen 54 with reference to printhead(s) 22 to help form the test pattern.

The optical sensor 50 is configured to generate topographical data of the test pattern formed on the platen 54 along with measurements of features in the topographical data of the test pattern. Controller 50 is configured to operate actuators 24 to move the sensor over the platen 54 to generate measurement data corresponding to the material drops on the platen. The sensor 50 can be a blue laser sensor available from Keyence Corporation of America, Itasca, Ill. in the LJ-V7000 series of two dimensional and three-dimensional laser measurement systems. This sensor can generate measurements of the material drops on the object as well as positional data regarding the location of the drops or features formed by the drops. These measurement data, which include height measurements of the structure in the test pattern on the platen 54, are provided as sensor data 52 to the controller 34. The controller 34 correlates the height measurement data with particular inkjets in the printheads of the printer 100. The compensation processor 54 uses these data measurements to identify differences in height between columns of material drops formed by different ejectors and height of the columns as identified by the data in the raster data file 42. The controller 34 compares these height differences to a predetermined threshold range and, when any difference lies outside the threshold range, the controller 34 modifies the firing signal parameters stored in a memory operatively connected to the controller 34. This memory can be a component in printhead(s) 22. This embodiment enables the modified parameters to be downloaded to the controller 34 and printhead driver 46 after the printhead is installed in a printer. These modified parameters are used to generate firing signals for operating the ejector in the printhead that formed the out of tolerance structure in the test pattern. The printhead driver 46 receives these modified firing signal parameters from the controller 34 and generates the firing signals for operating that ejector in the printhead. In this manner, the sensor 50 measures the height differences occurring in a test pattern constructed on platen 54 and controller 34 adjusts firing signal parameters for generating firing signals that operate ejectors in a printhead to compensate for ejectors that are ejecting material drops that are too large or too small. By operating the printheads to generate test patterns from time to time during printing of an object, the printer can keep the features of a printed object within acceptable tolerances by keeping the ink drop velocities within a predetermined range.

The term "firing signal parameter adjustment," as used in this document, refers to a change in a waveform component, such as, one of a peak voltage level parameter, a peak voltage duration parameter, or a frequency parameter for the firing signal. The change can be a relative increase or decrease in a peak voltage level defined for a firing signal, a relative increase or decrease in the duration of the peak voltage for the firing signal, or a relative increase or decrease in the frequency of the firing signal. Additionally, a combination of changes of two or all three parameters can be made. The firing signal parameter adjustment normalizes the material drop volumes ejected by the ejectors in the printheads so that the effective material drop volume is approximately the same for all material drops ejected by the printheads.

Figure 2:
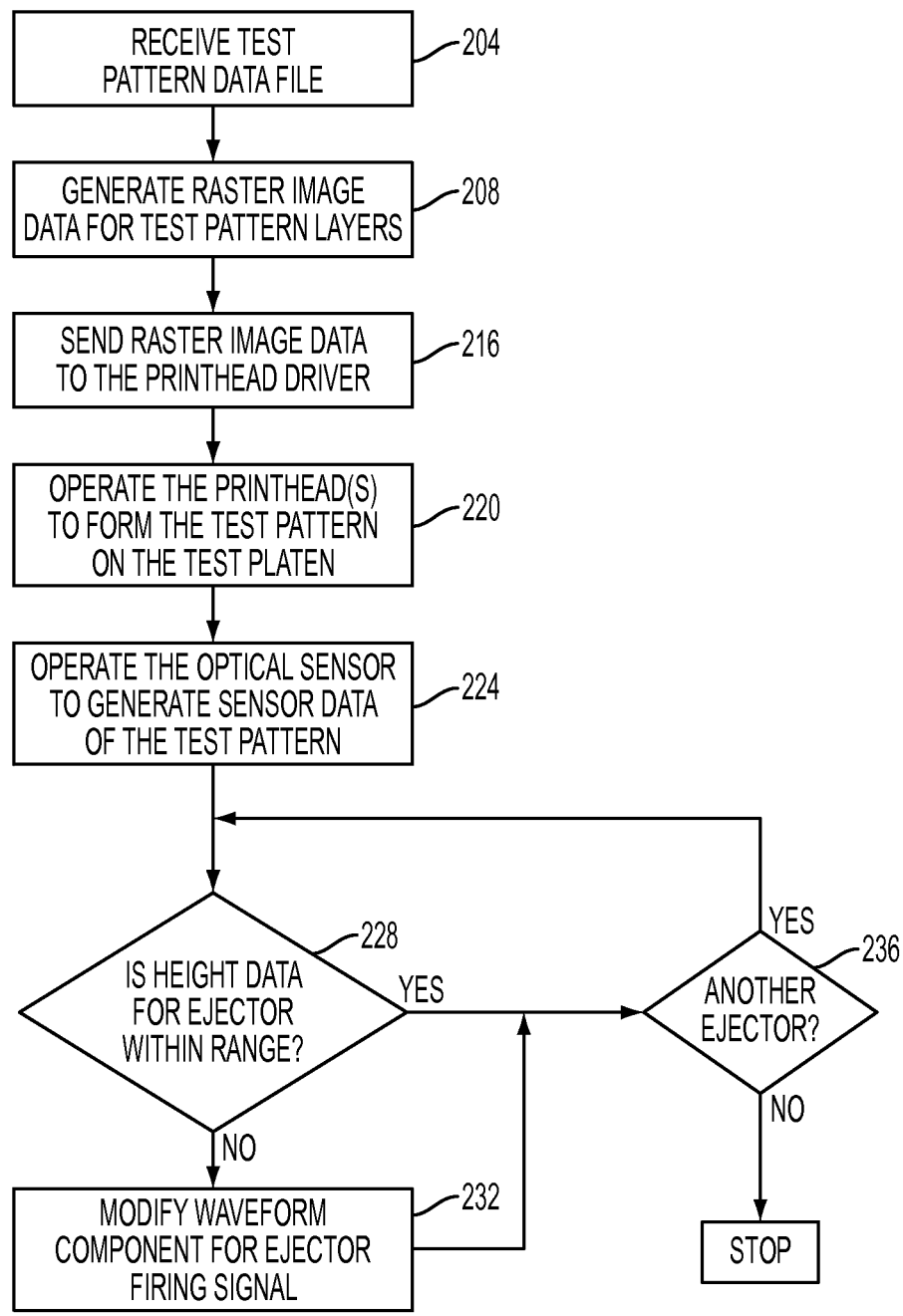
FIG. 2 is a flow diagram of a method of operating the printer of FIG. 1 to compensate for material drop volume variations.

A method 200 of operating a printer that compensates for measured errors in three-dimensional objects during their printing is shown in FIG. 2. In the description of this method, statements that a process is performing some task or function refers to a controller or general purpose processor executing programmed instructions stored in non-transitory computer readable storage media operatively connected to the controller or processor to manipulate data or to operate one or more components in the printer to perform the task or function. The controllers 34 and 38 noted above can be such a controller or processor. Alternatively, these controllers can be implemented with more than one processor and associated circuitry and components, each of which is configured to form one or more tasks or functions described herein.

At the beginning of an object printing operation, the raster image processor receives a data file of three-dimensional data for a test pattern (block 204). The raster image processor 38 generates raster image data for the layers to be printed to form the test pattern (block 208). The processor 38 passes the raster image data for the test pattern through to the printhead driver 46 (block 216). The driver generates the firing signals for operating the ejectors in the printhead with reference to the firing signal parameters received from the controller 34 and also controls movement of the platen 14 and the printhead(s) 22 to form the test pattern (block 220). After the test pattern is formed, the controller 34 operates actuators to move the optical sensor while the sensor generates topographical and measurement data for the controller (block 224). The controller 34 determines if the difference between the height measurement data corresponding to test pattern structure formed by any ejector and the expected height corresponding to raster data used to form the test pattern structure with the ejector are outside of a predetermined range (block 228). If difference is greater than the range, the controller modifies the firing signal parameters used to generate firing signals for that ejector and delivers them to the printhead driver 46 (block 232). The controller 34 determines if other ejectors remain to be checked (block 236). If other ejectors that formed structure in the test pattern remain for evaluation, the data corresponding to the next ejector is compared to the range (block 228) and a modification is made (block 232), if required. Once all of the structures in the test pattern have been checked and the corresponding firing signal parameters modified, if necessary, the process stops until the next test pattern is printed. Thus, the process of FIG. 2 measures the differences for each ejector used to form a test pattern, compares them to the predetermined range, and modifies any firing signal parameters for ejectors requiring adjustment so they eject ink drops at a velocity within a predetermined range. Once all of the ejectors that were used to form the test pattern have been evaluated, the printer is ready to resume object formation. The process of FIG. 2 could be repeated to confirm the adjustments were successful in bringing the ejectors within the tolerance range. If firing signal parameters cannot be adjusted to an extent successful to return the ejector to an appropriate operating range, then object formation can be terminated until the printhead(s) 22 can be serviced to restore ejector operation. Once the firing signal parameters have been adjusted, the printhead driver 46 generates the firing signals for operating the ejectors in the printhead with reference to the modified firing signal parameters.

The methods disclosed herein may be implemented by a processor being configured with instructions and related circuitry to perform the methods. Additionally, processor instructions can be stored on a non-transitory computer readable storage media so they can accessed and executed by a controller or other processor to operate a printer and compensate for drop volume variations during printing of a three-dimensional object. The programmed instructions stored on the non-transitory computer readable storage media are configured to enable a controller or other processor executing the programmed instructions to: (1) generate a test pattern with ejectors in printheads of the printer, (2) measure the heights of the columns in the test patterns, (3) generate the differences between the test pattern columns and the expected height of the columns corresponding to the raster data used to form the test pattern columns, (4) compare each difference to the predetermined range, and (5) compensate for variations in drop volumes between the ejectors in the printhead ejecting material to form the test pattern by modifying the firing signal parameters for at least one ejector in the printhead with reference to the generated differences.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A three-dimensional object printer comprising:
   a platen;
   a printhead configured with ejectors to eject drops of material towards the platen to form columns of material on the platen;
   an optical sensor configured to generate data corresponding to a height of the columns of the material on the platen at a plurality of locations on the platen; and
   a controller operatively connected to the optical sensor and the printhead, the controller being configured to generate raster image data for forming a test pattern on the platen having a plurality of columns of material, to operate the printhead to eject drops of material towards the platen with reference to the raster image data for the test pattern to form columns of material on the platen, each column of material corresponding to only one ejector in the printhead, and to modify firing signal parameters for at least one ejector with reference to a measured difference in height between the column of material in the test pattern formed by the at least one ejector and a height corresponding to raster data used to operate the at least one ejector to form the column of material with the at least one ejector in the test pattern to compensate for variations in a volume for the drops of material ejected by the at least one ejector and volumes of drops of material ejected by the other ejectors in the printhead ejecting material.

2. The printer of claim 1 wherein the optical sensor is a blue laser sensor.

3. The printer of claim 1 wherein the platen is a planar member.

4. The printer of claim 1, the controller being further configured to:
   measure the difference in height between each column of material formed by ejector and the height corresponding to the raster data used to operate each ejector to form one column in the columns of material in the test pattern with reference to the height data received from the optical sensor for each column; and
   modify the firing signal parameter for each ejector with reference to the measured difference corresponding to each ejector.

5. The printer of claim 1, the controller being further configured to:
   modify the firing signal parameter by changing a frequency parameter.

6. The printer of claim 1, the controller being further configured to:
   modify the firing signal parameter by changing a peak voltage parameter.

7. The printer of claim 1, the controller being further configured to:
   modify the firing signal parameter by changing a duration for a peak voltage parameter.

8. The printer of claim 1, the controller being further configured to compare each measured difference corresponding to each ejector to a predetermined range and modify the firing signal parameter for each ejector having a measured difference outside the predetermined range.

9. A method for operating a three-dimensional object printer comprising:
   generating with a controller raster image data for operating a plurality of ejectors in a printhead to eject drops of material from the ejectors and form a column of material in a test pattern on a platen in the printer for each ejector ejecting drops of material;
   operating a printhead to eject drops of material from ejectors in the printhead towards the platen with reference to the generated raster image data for the test pattern to form a column of material on the platen for each ejector ejecting drops of material;
   generating data with an optical sensor that corresponds to a height of material for each column of material in the test pattern formed on the platen at a plurality of locations on the platen; and
   modifying firing signal parameters for at least one ejector in the printhead with reference to a measured difference in height between the column of material in the test pattern corresponding to the at least one ejector and a height corresponding to raster data used to operate the least one ejector to form the column in the test pattern to compensate for variations in volumes of the drops of material ejected by the at least one ejector and the drops of material ejected by the other ejectors in the printhead ejecting material.

10. The method of claim 9 wherein the generated height data is generated with a blue laser sensor.

11. The method of claim 9 wherein the operation of the printhead ejects material drops towards a planar member.

12. The method of claim 9 further comprising:
    measuring a difference in height between each column of material being formed by the ejectors and the height corresponding to the raster data used to operate each ejector to form each column of material in the test pattern with reference to the height data generated by the optical sensor for each column in the test pattern on the platen; and
    modifying the firing signal parameter for each ejector with reference to the measured difference corresponding to each ejector.

13. The method of claim 12 further comprising:
    comparing with the controller each measured difference to a predetermined range; and
    modifying with the controller the firing signal parameter for each ejector for which the measured difference is outside the predetermined range.

14. The method of claim 9, the modification of the firing signal parameter further comprising:

changing a frequency parameter.

15. The method of claim 9, the modification of the firing signal parameter further comprising:

changing a peak voltage parameter.

16. The method of claim 9, the modification of the firing signal parameter further comprising:

changing a duration for a peak voltage parameter.

17. A non-transitory computer readable storage media on which programmed instructions for operating a printer having been stored, the programmed instructions being configured to enable a controller executing the programmed instructions to:

(1) generate a test pattern having columns of material with ejectors in printheads of the printer, the ejectors being operated with reference to raster data to eject drops of material to form the columns of material in the test pattern;

(2) measure a height of each column in the test pattern;

(3) generate differences between each measured height of the test pattern columns and each expected height for each column of the test pattern corresponding to the raster data used to operate the ejectors to form the columns of material in the test pattern;

(4) compare each difference to a predetermined range; and (5) modifying a firing signal parameter for each ejector in the printhead having a generated difference that is outside of the predetermined range.

* * * * *